(12) United States Patent
Morein et al.

(10) Patent No.: US 9,977,756 B2
(45) Date of Patent: *May 22, 2018

(54) INTERNAL BUS ARCHITECTURE AND METHOD IN MULTI-PROCESSOR SYSTEMS

(71) Applicant: Advanced Micro Devices, Inc., Sunnyvale, CA (US)

(72) Inventors: Stephen Morein, San Jose, CA (US); Mark S. Grossman, Palo Alto, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 519 days.

This patent is subject to a terminal disclaimer.

(21) Appl. No.: 14/543,667

(22) Filed: Nov. 17, 2014

(65) Prior Publication Data

US 2015/0074313 A1 Mar. 12, 2015

Related U.S. Application Data

(63) Continuation of application No. 12/245,686, filed on Oct. 3, 2008, now Pat. No. 8,892,804.

(51) Int. Cl.
*G06F 13/40* (2006.01)

(52) U.S. Cl.
CPC ...... *G06F 13/4027* (2013.01); *G06F 13/4031* (2013.01); *G06F 13/4068* (2013.01)

(58) Field of Classification Search
CPC ..... G06F 3/14; G06F 13/4027; G06F 13/4265
See application file for complete search history.

(56) References Cited

U.S. PATENT DOCUMENTS

| | | | |
|---|---|---|---|
| 5,712,664 A | 1/1998 | Reddy | |
| 5,999,183 A | 12/1999 | Kilgariff | |
| 6,359,624 B1 | 3/2002 | Kunimatsu | |
| 6,473,086 B1 | 10/2002 | Morein | |
| 6,567,880 B1 | 5/2003 | Olarig | |
| 6,570,571 B1 | 5/2003 | Morozumi | |
| 6,587,905 B1 | 7/2003 | Correale, Jr. et al. | |
| 6,606,614 B1 | 8/2003 | Paillet | |
| 6,662,257 B1 | 12/2003 | Caruk et al. | |
| 6,700,580 B2 | 3/2004 | Lefebvre et al. | |
| 6,802,021 B1 | 10/2004 | Cheng et al. | |
| 6,874,042 B2 | 3/2005 | Sauber | |
| 6,956,579 B1 | 10/2005 | Diard | |
| 6,985,152 B2 | 1/2006 | Rubinstein et al. | |

(Continued)

FOREIGN PATENT DOCUMENTS

| | | |
|---|---|---|
| CN | 1890660 A | 1/2007 |
| CN | 1983226 A | 6/2007 |

(Continued)

OTHER PUBLICATIONS

Eilemann et al. "Parallel Rendering on Hybrid Multi-GPU Clusters" The Eurographics Association, 2012 (9 pages).

(Continued)

*Primary Examiner* — Brian T Misiura
(74) *Attorney, Agent, or Firm* — Volpe and Koenig, P.C.

(57) ABSTRACT

An internal bus architecture and method is described. Embodiments include a system with multiple bus endpoints coupled to a bus. In addition, the bus endpoints are directly coupled to each other. Embodiments are usable with known bus protocols.

13 Claims, 4 Drawing Sheets

(56) References Cited

U.S. PATENT DOCUMENTS

| | | |
|---|---|---|
| 7,068,278 B1 | 6/2006 | Williams et al. |
| 7,095,415 B2 | 8/2006 | Chang et al. |
| 7,119,808 B2 | 10/2006 | Gonzalez et al. |
| 7,246,190 B2 | 7/2007 | Nguyen et al. |
| 7,275,123 B2 | 9/2007 | Duncan et al. |
| 7,289,125 B2 | 10/2007 | Diard et al. |
| 7,325,086 B2 | 1/2008 | Kong et al. |
| 7,340,557 B2 | 3/2008 | Kong et al. |
| 7,372,465 B1 | 5/2008 | Tamasi et al. |
| 7,383,412 B1 | 6/2008 | Diard |
| 7,412,554 B2 | 8/2008 | Danilak |
| 7,420,565 B2 | 9/2008 | Rubinstein et al. |
| 7,424,564 B2 | 9/2008 | Mehta |
| 7,451,259 B2 * | 11/2008 | Duncan ............... H04L 49/90 709/230 |
| 7,461,195 B1 | 12/2008 | Woodral |
| 7,475,174 B2 | 1/2009 | Chow et al. |
| 7,477,256 B1 | 1/2009 | Johnson |
| 7,480,757 B2 | 1/2009 | Atherton et al. |
| 7,500,041 B2 | 3/2009 | Danilak |
| 7,500,083 B2 | 3/2009 | Trivedi et al. |
| 7,525,548 B2 | 4/2009 | Azar et al. |
| 7,535,433 B2 | 5/2009 | Ledebohm et al. |
| 7,539,801 B2 | 5/2009 | Xie |
| 7,545,380 B1 * | 6/2009 | Diard ............... G09G 5/363 345/440 |
| 7,562,174 B2 | 7/2009 | Danilak |
| 7,576,745 B1 | 8/2009 | de Waal et al. |
| 7,594,061 B2 | 9/2009 | Shen et al. |
| 7,598,958 B1 | 10/2009 | Kelleher |
| 7,613,346 B2 | 11/2009 | Hunkins et al. |
| 7,616,206 B1 | 11/2009 | Danilak |
| 7,616,207 B1 | 11/2009 | Diard |
| 7,617,348 B2 | 11/2009 | Danilak |
| 7,619,629 B1 | 11/2009 | Danilak |
| 7,623,131 B1 | 11/2009 | Johnson |
| 7,633,505 B1 | 12/2009 | Kelleher |
| 7,649,537 B2 | 1/2010 | Campbell |
| 7,663,633 B1 | 2/2010 | Diamond |
| 7,663,635 B2 | 2/2010 | Rogers et al. |
| 7,721,118 B1 | 5/2010 | Tamasi et al. |
| 7,782,325 B2 | 8/2010 | Gonzalez |
| 7,782,327 B2 | 8/2010 | Gonzalez et al. |
| 7,793,029 B1 | 9/2010 | Parson |
| 7,800,611 B2 | 9/2010 | Bakalash et al. |
| 7,898,546 B1 * | 3/2011 | Eitzmann ............... G06T 1/60 345/522 |
| 8,035,645 B2 | 10/2011 | Diard |
| 8,054,314 B2 | 11/2011 | Kelley et al. |
| 8,066,515 B2 | 11/2011 | Johnson et al. |
| 8,103,993 B2 | 1/2012 | Atherton et al. |
| 8,130,227 B2 * | 3/2012 | Johnson ............... G06T 15/503 345/501 |
| 8,161,209 B2 | 4/2012 | Morein et al. |
| 8,294,731 B2 * | 10/2012 | Tuomi ............... G06T 1/60 345/536 |
| 8,373,709 B2 | 2/2013 | Solki et al. |
| 8,412,872 B1 | 4/2013 | Wagner et al. |
| 8,730,247 B2 | 5/2014 | Hiroi et al. |
| 8,730,248 B2 | 5/2014 | Sasaki et al. |
| 8,892,804 B2 | 11/2014 | Morein et al. |
| 2003/0158886 A1 | 8/2003 | Walls et al. |
| 2005/0140682 A1 | 6/2005 | Sumanaweera |
| 2005/0237327 A1 | 10/2005 | Rubinstein et al. |
| 2006/0098016 A1 | 5/2006 | Chou et al. |
| 2006/0267990 A1 | 11/2006 | Rogers et al. |
| 2006/0267993 A1 | 11/2006 | Hunkins |
| 2006/0271713 A1 | 11/2006 | Xie |
| 2006/0282604 A1 | 12/2006 | Temkine et al. |
| 2007/0016711 A1 | 1/2007 | Yang |
| 2007/0038794 A1 | 2/2007 | Purcell |
| 2007/0139422 A1 | 6/2007 | Kong et al. |
| 2007/0224844 A1 | 9/2007 | Chuang et al. |
| 2008/0200043 A1 | 8/2008 | Yeh |
| 2010/0026691 A1 | 2/2010 | Yan |
| 2010/0066747 A1 | 3/2010 | Diard |
| 2010/0088452 A1 | 4/2010 | Morein et al. |
| 2011/0238938 A1 | 9/2011 | Kloeppner |
| 2013/0147815 A1 | 6/2013 | Solki et al. |

FOREIGN PATENT DOCUMENTS

| | | |
|---|---|---|
| JP | 2007048269 A | 2/2007 |
| JP | 2007535042 A | 11/2007 |
| JP | 2007316859 A | 12/2007 |
| JP | 2008123135 A | 5/2008 |

OTHER PUBLICATIONS

Hong et al. "Efficient Parallel Graph Exploration on Multi-Core CPU and GPU" Stanford University. Parallel Architectures and Compilation Techniques (PACT). Oct. 2011 (11 pages).

NVIDIA. Introducing Hybrid SLI Technology. Technical Brief. Mar. 11, 2008 (18 pages).

PCI-SIG. PCI Express Base Specification. Revision 1.0. Apr. 29, 2002.

Song et al. "Enabling and Scaling Matrix Computations on Heterogeneous Multi-Core and Multi-GPU Systems" ACM. 2012. (11 pages).

\* cited by examiner

Bus address space configuration

INTERNAL BUS ARCHITECTURE AND METHOD IN MULTI-PROCESSOR SYSTEMS

CROSS-REFERENCE(S) TO RELATED APPLICATIONS

This application is a continuation of U.S. application Ser. No. 12/245,686, filed Oct. 3, 2008, which is incorporated by reference as if fully set forth herein.

TECHNICAL FIELD

The invention is in the field of data transfer in computer and other digital systems.

BACKGROUND

As computer and other digital systems become more complex and more capable, methods and hardware to enhance the transfer of data between system components or elements continually evolve. Data to be transferred include signals representing data, commands, or any other signals. Speed and efficiency of data transfer is particularly critical in systems that run very data-intensive applications, such as graphics applications. In typical systems, graphics processing capability is provided as a part of the central processing unit (CPU) capability, or provided by a separate special purpose processor such as a graphics processing unit (GPU) that communicates with the CPU and assists in processing graphics data for applications such as video games, etc. One or more GPUs may be included in a system. In conventional multi-GPU systems, a bridged host interface (for example a peripheral component interface express (PCIE)) interface must share bandwidth between peer to peer traffic and host traffic. Traffic consists primarily of memory data transfers but may often include commands. FIG. 1 is a block diagram of a prior art system 100 that includes a root 102. A typical root 102 is a computer chipset, including a central processing unit (CPU), a host bridge 104, and two endpoints EP0 106a and EP1 106b. Endpoints are bus endpoints and can be various peripheral components, for example special purpose processors such as graphics processing units (GPUs). The root 102 is coupled to the bridge 104 by one or more buses to communicate with peripheral components. Some peripheral component endpoints (such as GPUs) require a relatively large amount of bandwidth on the bus because of the large amount of data involved in their functions. It would be desirable to provide an architecture that reduced the number of components and yet provided efficient data transfer between components.

DETAILED DESCRIPTION

Embodiments of an internal host bus bridge architecture and method are described herein. Embodiments include a system with multiple bus endpoints coupled to a bus root via a host bus bridge that is internal to at least one bus endpoint. In addition, the bus endpoints are directly coupled to each other. Embodiments are usable with known bus protocols.

Figure 1:
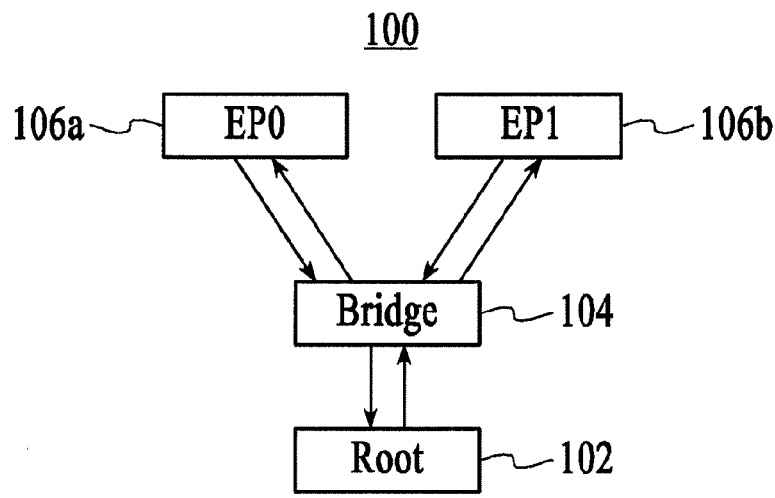
FIG. 1 is a block diagram of a prior art processing system with peripheral components.
Figure 2:
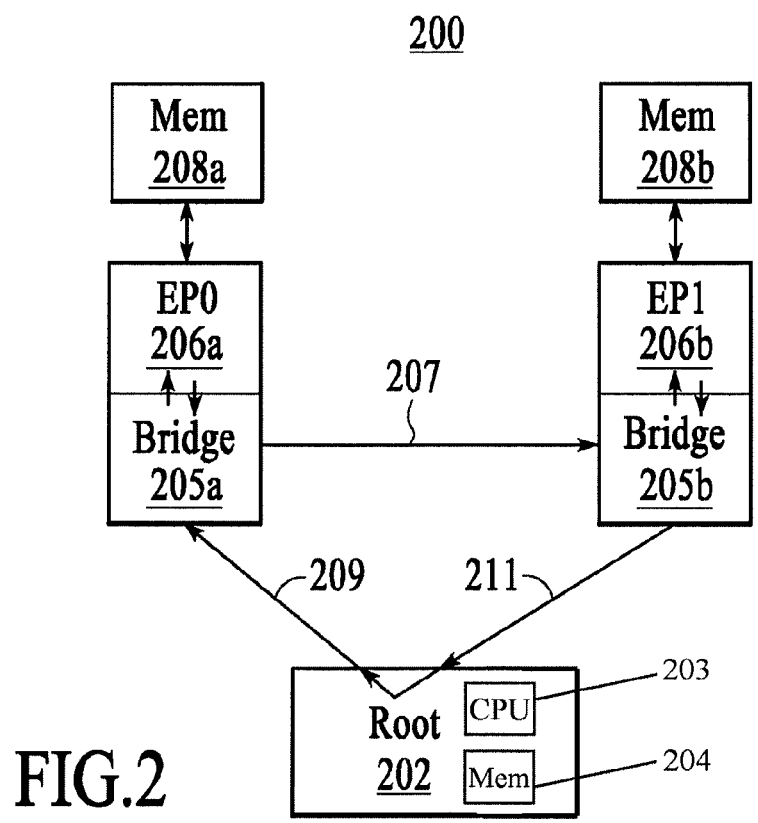
FIG. 2 is a block diagram of portions of a processing system with peripheral components, according to an embodiment.

FIG. 2 is a block diagram of portions of a processing system 200 with peripheral components, according to an embodiment. System 200 includes a bus root 202 that is similar to the bus root 102 of FIG. 1. The bus root 202 in an embodiment is a chipset including a CPU 203 and system memory 204. The root 202 is coupled via a bus 209 to an endpoint EP0 206a that includes an internal bridge 205a. The bus 209 in an embodiment is a PCI express (PCIe®) bus, but embodiments are not so limited. EP0 206a is coupled to another endpoint EP1 206b. EP1 206b includes an internal bridge 205b. EP0 205a and EP1 205B are through their respective bridges via a bus 207. EP1 206b is coupled through its bridge 205b to the root 202 via a bus 211. Each of endpoints EP0 206a and EP1 206b includes respective local memories 208a and 208b. From the perspective of the root 202, 209 and 211 make up transmit and receive lanes respectively of a standard bidirectional point to point data link.

In an embodiment, EP0 206a and EP1 206b are identical. As further explained below, in various embodiments, bridge 205b is not necessary, but is included for the purpose of having one version of an endpoint, such as one version of a GPU, rather than manufacturing two different versions. Note that EP0 may be used standalone by directly connecting it to root 202 via buses 209 and 207; similarly EP1 may be used standalone by directly connecting it to root 202 via buses 207 and 211.

The inclusion of a bridge 205 eliminates the need for an external bridge such as bridge 104 of FIG. 1 when both EP0 and EP1 are present. In contrast to the "Y" or "T" formation of FIG. 1, system 200 moves data in a loop (in this case in a clockwise direction). The left endpoint EP0 can send data directly to the right endpoint EP1. The return path from EP1 to EP0 is through the root 202. As such, the root has the ability to reflect a packet of data coming in from EP1 back out to EP0. In other words, the architecture provides the appearance of a peer-to-peer transaction on the same pair of wires as is used for endpoint to root transactions.

EP0 206a and EP1 206b are also configurable to operate in the traditional configuration. That is, EP0 206a and EP1 206b are each configurable to communicate directly with the root 202 via buses 209 and 211, which are each bidirectional in such a configuration.

Figure 3:
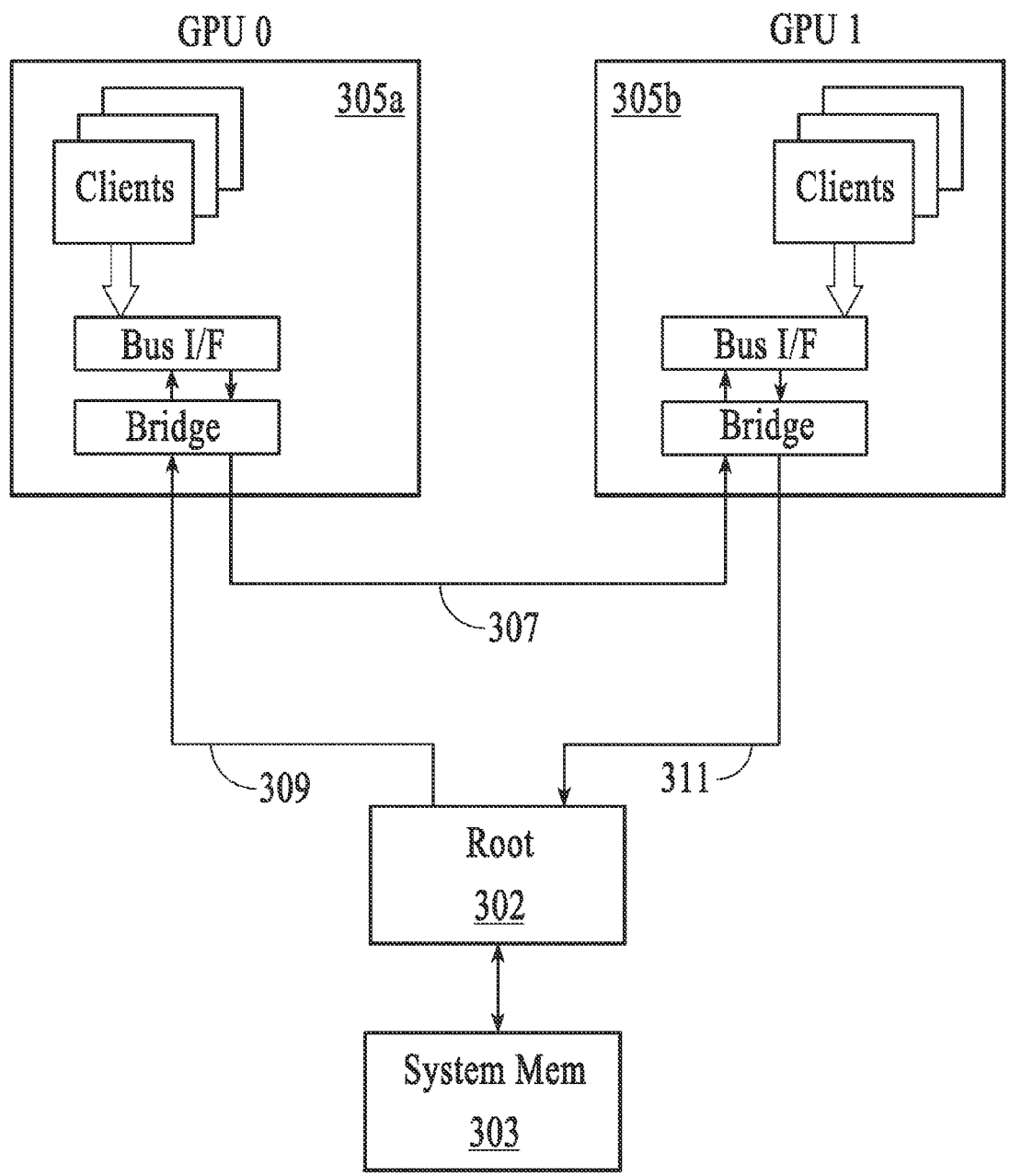
FIG. 3 is a more detailed block diagram of a processing system with peripheral components, according to an embodiment.

FIG. 3 is a more detailed block diagram of a processing system with peripheral components, according to an embodiment. System 300 is similar to system 200, but additional details are shown. System 300 includes a bus root 302 coupled to a system memory 303. The bus root 302 is further coupled to an endpoint 305a via a bus 309. For purposes of illustrating a particular embodiment, endpoints 305a and 305b are GPUs, but embodiments are not so limited. GPU0 305a includes multiple clients. Clients include logic, such as shader units and decoder units, for performing tasks. The clients are coupled to an internal bridge through bus interface (I/F) logic, which control all of the read operations and write operations performed by the GPU.

GPU0 305a is coupled to a GPU1 305b via a bus 307 from the internal bridge of GPU0 305a to the internal bridge of GPU1 305b. In an embodiment, GPU1 305b is identical to GPU0 305a and includes multiple clients, an internal bridge and I/F logic. Each GPU typically connects to a dedicated local memory unit often implemented as GDDR DRAM. GPU1 305b is coupled to the bus root 302 via a bus 311. In one embodiment, as the arrows indicate, data and other messages such as read requests and completions flow in a clockwise loop from the bus root 302 to GPU0 305a to GPU1 305b.

In other embodiments, one of the GPUs 305 does not include a bridge. In yet other embodiments, data flows counterclockwise rather than clockwise.

In one embodiment, the protocol that determines data routing is communicated with in such as ways as to make the architecture appears the same as the architecture of FIG. 1. In particular, the bridge in 305b must appear on link 307 to bridge 305a as an upstream port, whereas the corresponding attach point on the bridge in 305a must appear on link 309 to root 302 as a downstream port. Furthermore, the embedded bridge must be able to see its outgoing link as a return path for all requests it receives on its incoming link, even though the physical routing of the two links is different. This is achieved by setting the state of a Chain Mode configuration strap for each GPU. If the strap is set to zero, the bridge assumes both transmit and receive links are to an upstream port, either a root complex or a bridge device. If the strap is set to one, the bridge assumes a daisy-chain configuration.

In another embodiment, the peer to peer bridging function of the root is a two-step process according to which GPU1 305b writes data to the system memory 303, or buffer. Then as a separate operation GPU0 305a reads the data back via the bus root 302.

The bus root 302 responds to requests normally, as if the internal bridge were an external bridge (as in FIG. 1). In an embodiment, the bridge of GPU0 305a is configured to be active, while the bridge of GPU1 305b is configured to appear as a wire, and simply pass data through. This allows the bus root 302 to see buses 309 and 311 as a normal peripheral interconnect bus. When the bus root reads from the bridge of GPU0 305a, this bridge sends the data to pass through the bridge of GPU1 305b and return to the bus root 302 as if the data came directly from GPU0 305a.

Figure 4:
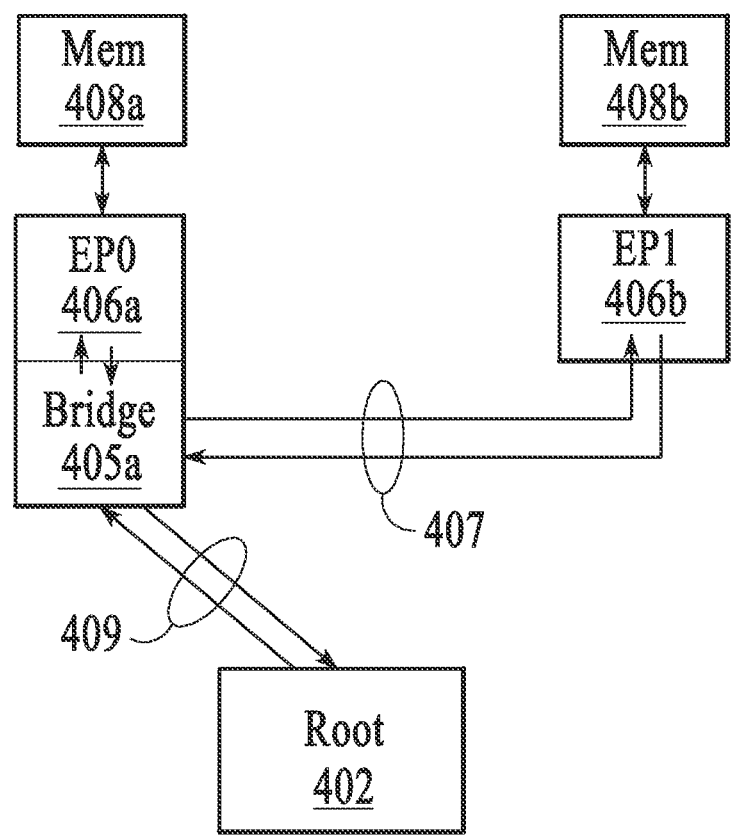
FIG. 4 is a block diagram of an embodiment in which one bus endpoint includes an internal bridge.

FIG. 4 is a block diagram of a system 400 in which one of the multiple bus endpoints includes an internal bridge. System 400 includes a bus root 402, and an EP0 406a that includes a bridge 405a. EP0 406a is coupled to the root 402 through the bridge 405a via a bus 409, and also to EP1b 406b through the bridge 405a via a bus 407. Each of endpoints EP0 406a and EP1 406b includes respective local memories 408a and 408b.

Figure 5:
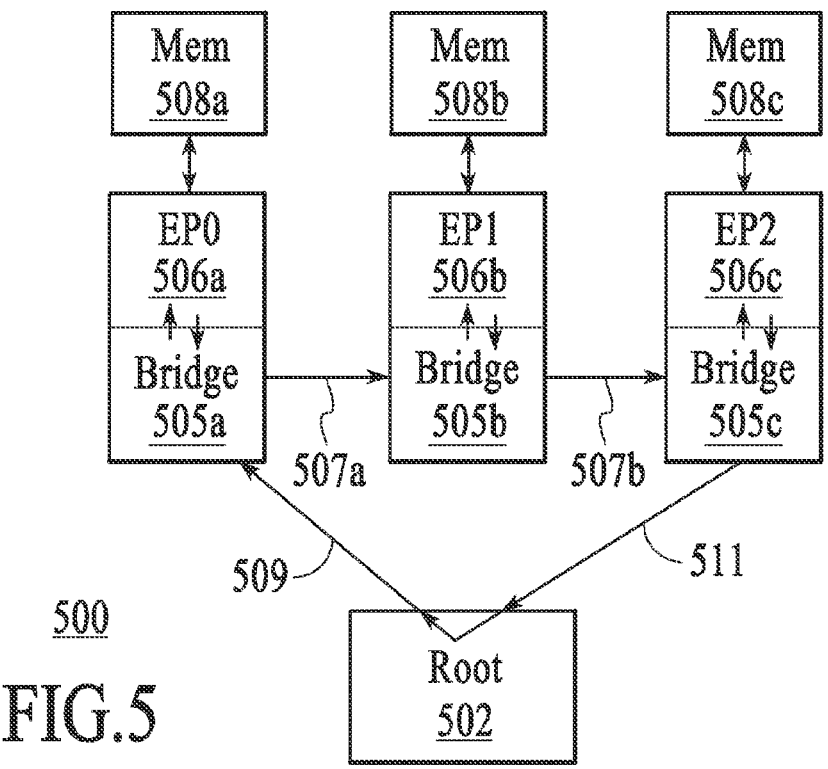
FIG. 5 is a block diagram of an embodiment that includes more than two bus endpoints, each including an internal bridge.

FIG. 5 is a block diagram of a system 500 including more than two bus endpoints, each including an internal bridge. System 500 includes a bus root 502, and an EP0 506a that includes a bridge 505a and a local memory 508a. System 500 further includes an EP1 506b that includes a bridge 505b and a local memory 508b, and an EP1 506c that includes a bridge 505c and an internal memory 508c.

EP0 506a is coupled to the root 502 through the bridge 505a via a bus 509, and also to EP1b 506b through the bridge 506b via a bus 507a. EP0 506b is coupled to EP1c 506c through the bridge 506c via a bus 507b. Other embodiments include additional endpoints that are added into the ring configuration. In other embodiments, the system includes more than two endpoints 506, but the rightmost endpoint does not include an internal bridge. In yet other embodiments the flow of data is counterclockwise as opposed clockwise, as shown in the figures.

Referring again to FIG. 3, there are two logical ports on the internal bridge according to an embodiment. One port is "on" in the bridge of GPU0 305a, and one port is "off" in the bridge of GPU1 305b. The bus root 302 may perform write operations by sending requests on bus 309. A standard addressing scheme indicates to the bridge to send the request to the bus I/F. If the request is for GPU1 305b, the bridge routes the request to bus 307. So in an embodiment, the respective internal bridges of GPU0 305a and GPU1 305b are programmed differently.

Figure 6:
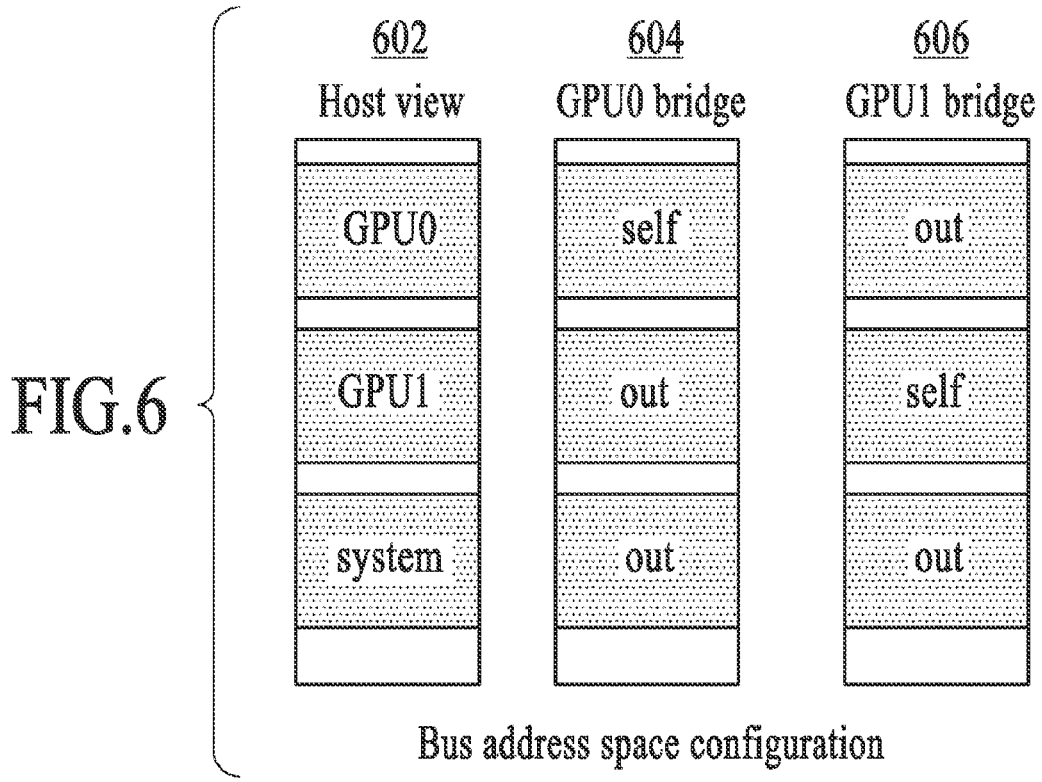
FIG. 6 is a block diagram illustrating views of memory space from the perspectives of various components in a system, according to an embodiment.

FIG. 6 is a block diagram illustrating the division of bus address ranges and the view of memory space from the perspective of various components. With reference also to FIG. 3, 602 is a view of memory from the perspective of the bus root, or Host processor 302. 604 is a view of memory from the perspective of the GPU0 305a internal bridge. 606 is a view of memory from the perspective of the GPU1 305b internal bridge. The bus address range is divided into ranges for GPU0 305a, GPU1 305b, and system 302 memory spaces. The GPU0 305a bridge is set up so that incoming requests to the GPU0 305a range are routed to its own local memory. Incoming requests from the root or from GPU0 305a itself to GPU1 305b or system 302 ranges are routed to the output port of GPU0 305a. The GPU1 305b bridge is set up slightly differently so that incoming requests to the GPU1 305b range are routed to its own local memory. Requests from GPU0 305a or from GPU1 305b itself to root or GPU0 305a ranges are routed to the output port of GPU1 305b.

The host sees the bus topology as being like the topology of FIG. 1. GPU1 305b can make its own request to the host processor 302 through its own bridge and it will pass through to the host processor 302. When the host processor 302 is returning a request, it goes through the bridge of GPU0 305a, which has logic for determining where requests and data are to be routed.

Write operations from GPU1 305b to GPU0 305a can be performed in two passes. GPU1 305b sends data to a memory location in the system memory 303. Then separately, GPU0 305a reads the data after it learns that the data is in the system memory 303.

Completion messages for read data requests and other split-transaction operations must travel along the wires in the same direction as the requests. Therefore in addition to the address-based request routing described above, device-based routing must be set up in a similar manner. For example, the internal bridge of GPU0 305a recognizes that the path for both requests and completion messages is via bus 307.

An embodiment includes power management to improve power usage in lightly loaded usage cases. For example in a usage case with little graphics processing, the logic of GPU1 305b is powered off and the bridging function in GPU1 305b is reduced to a simple passthrough function from input port to output port. Furthermore, the function of GPU0 305a is reduced to not process transfers routed from the input port to the output port. In an embodiment, there is a separate power supply for the bridging function in GPU1 305b. Software detects the conditions under which to power down. Embodiments include a separate power regulator and/or separate internal power sources for bridges that are to be powered down separately from the rest of the logic on the device.

Even in embodiments that do not include the power management described above, system board area is conserved because an external bridge (as in FIG. 1) is not required. The board area and power required for the external bridge and its pins are conserved. On the other hand, it is not required that each of the GPUs have its own internal bridge. In another embodiment, GPU1 305b does not have an internal bridge, as described with reference to FIG. 4.

The architecture of system 300 is practical in a system that includes multiple slots for add-in circuit boards. Alternatively, system 300 is a soldered system, such as on a mobile device.

Buses 307, 309 and 311 can be PCIe® buses or any other similar peripheral interconnect bus.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

The term "processor" as used in the specification and claims includes a processor core or a portion of a processor. Further, although one or more GPUs and one or more CPUs are usually referred to separately herein, in embodiments both a GPU and a CPU are included in a single integrated circuit package or on a single monolithic die. Therefore a single device performs the claimed method in such embodiments.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a DVR or PVR, a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in computer-readable medium, other aspects may likewise be embodied in computer-readable medium. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. The claimed invention may be embodied in computer code (e.g., HDL, Verilog, etc.) that is created, stored, synthesized, and used to generate GDSII data (or its equivalent). An ASIC may then be manufactured based on this data.

Accordingly, the inventors reserve the right to add additional claims after filing the application to pursue such additional claim forms for other aspects of the method and system.

What is claimed is:

1. A system comprising:
   a first bus;
   a CPU in communication with the first bus;
   a first component having a first bridge in communication with the CPU via the first bus and in communication with a second bus; and
   a second component in communication with the first component via the second bus and in communication with the CPU via the first bus, through the second bus,
   wherein communication between the first bus and the first component includes a unidirectional transfer of data from the first bus to the first component, and wherein communication between the first component and the second component includes a unidirectional transfer of data from the first component to the second component via the second bus.

2. The system of claim 1 wherein the first and second components are first and second graphics processing units (GPUs).

3. The system of claim 1, wherein:
communication between the second component and the CPU further includes a unidirectional transfer of data from the second component to the CPU via a third bus.

4. The system of claim 3, wherein:
communication from the CPU to the second component occurs through the first component but not through the third bus; and
communication from the second component to the CPU occurs through the third bus but not through the first component.

5. A method comprising:
communicating between a CPU and a first bus;
communicating, via the first bus, with a first bridge of a first component; and
communicating, via the first bus, the first bridge, and a second bus coupled between the first component and a second component, between the second component and the CPU,
wherein communication between the first bus and the first component includes transferring data unidirectionally from the first bus to the first component, and
communication between the first component and the second component includes transferring data unidirectionally from the first component to the second component via the second bus.

6. A system comprising:
a first bus;
a CPU in communication with the first bus;
a first component having a first bridge in communication with the CPU via the first bus and in communication with a second bus; and
a second component in communication with the first component via the second bus and in communication with the CPU via the first bus, through the second bus,
wherein communication between the first bus and the first component includes a bidirectional transfer of data between the first bus and the first component, and
wherein communication between the first component and the second component includes a bidirectional transfer of data between the first component and the second component via the second bus, and
wherein communication between the second component and the CPU occurs via the first component and does not occur directly.

7. The system of claim 6, wherein the second component does not include a bridge.

8. A system comprising:
a first bus;
a CPU in communication with the first bus;
a first component having a first bridge in communication with the CPU via the first bus and in communication with a second bus; and
a second component in communication with the first component via the second bus and in communication with the CPU via the first bus, through the second bus
wherein the first bridge comprises a peripheral component interconnect express bridge ("PCIe bridge"), and
wherein the PCIe bridge is coupled to the CPU via a bus root.

9. A method comprising:
communicating between a CPU and a first bus;
communicating, via the first bus, with a first bridge of a first component; and
communicating, via the first bus, the first bridge, and a second bus coupled between the first component and a second component, between the second component and the CPU,
wherein communication between the second component and the CPU further includes a unidirectional transfer of data from the second component to the CPU via a third bus.

10. The method of claim 9, wherein:
communication from the CPU to the second component occurs through the first component but not through the third bus; and
communication from the second component to the CPU occurs through the third bus but not through the first component.

11. The method of claim 10, wherein:
communication between the second device and the CPU occurs via the first component and does not occur directly.

12. The method of claim 10, wherein the second component does not include a bridge.

13. A method comprising:
communicating between a CPU and a first bus;
communicating, via the first bus, with a first bridge of a first component; and
communicating, via the first bus, the first bridge, and a second bus coupled between the first component and a second component, between the second component and the CPU,
wherein the first bridge comprises a peripheral component interconnect express bridge ("PCIe bridge"), and
wherein the PCIe bridge is coupled to the CPU via a bus root.

* * * * *